(12) United States Patent
Rothkopf et al.

(10) Patent No.: US 9,531,235 B2
(45) Date of Patent: Dec. 27, 2016

(54) DYNAMIC CENTER OF MASS

(75) Inventors: Fletcher Rothkopf, Los Altos, CA (US); Colin M. Ely, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 429 days.

(21) Appl. No.: 13/458,613

(22) Filed: Apr. 27, 2012

(65) Prior Publication Data

US 2013/0285490 A1 Oct. 31, 2013

(51) Int. Cl.
*H02K 11/00* (2016.01)
*H02K 7/06* (2006.01)

(52) U.S. Cl.
CPC ............ *H02K 7/063* (2013.01); *H02K 11/00* (2013.01)

(58) Field of Classification Search
CPC .............................. H02K 7/063; H02K 11/00
USPC ................. 310/66, 81; 340/7.6, 7.58; 74/87
IPC ............................................ H02K 11/00, 7/063
See application file for complete search history.

(56) References Cited

U.S. PATENT DOCUMENTS

| | | |
|---|---|---|
| 2,171,808 A | 9/1939 | Von Schlippe |
| 2,989,869 A | 6/1961 | Hanggi |
| 3,606,296 A | 9/1971 | Chassagne |
| 3,772,923 A | 11/1973 | Burt |
| 3,919,575 A | 11/1975 | Weber et al. |
| 4,278,726 A | 7/1981 | Wieme |
| 4,288,051 A | 9/1981 | Göschel |
| 4,314,735 A | 2/1982 | Fullenkamp et al. |
| 4,370,894 A * | 2/1983 | Sturesson ................. 74/87 |
| 4,580,456 A * | 4/1986 | Takano ............. B06B 1/164 366/128 |
| 4,849,580 A | 7/1989 | Reuter |
| 4,940,336 A | 7/1990 | Dryga et al. |
| 5,182,158 A | 1/1993 | Schaeffer |
| 5,349,893 A | 9/1994 | Dunn |
| 5,368,914 A | 11/1994 | Barrett |
| 5,426,562 A | 6/1995 | Morehouse et al. |
| 5,507,665 A | 4/1996 | Oda |
| 5,587,854 A | 12/1996 | Sato et al. |
| 5,606,341 A | 2/1997 | Aguilera |
| 5,659,376 A | 8/1997 | Uehara et al. |
| 5,666,261 A | 9/1997 | Aguilera |
| 5,783,297 A | 7/1998 | Wise et al. |
| 5,909,074 A * | 6/1999 | Takaya et al. ........... 310/81 |
| 5,936,600 A | 8/1999 | Ohashi et al. |
| 5,965,249 A | 10/1999 | Sutton et al. |
| 5,982,617 A | 11/1999 | Haley et al. |
| 6,154,360 A | 11/2000 | Kaczeus et al. |
| 6,262,888 B1 | 7/2001 | Siedow et al. |
| 6,288,489 B1 | 9/2001 | Isohata et al. |
| 6,323,757 B1 * | 11/2001 | Nagai ............... H02K 7/061 310/81 |
| 6,324,054 B1 | 11/2001 | Chee et al. |

(Continued)

FOREIGN PATENT DOCUMENTS

| | | |
|---|---|---|
| CN | 1458804 | 11/2003 |
| CN | 2710238 | 7/2005 |

(Continued)

*Primary Examiner* — John K Kim
(74) *Attorney, Agent, or Firm* — Joseph F. Guihan (57) ABSTRACT

Systems and methods involving reconfigurable rotating masses are disclosed. One embodiment may take the form of a system having a motor and coupled weights attached to the motor. Operation of the motor rotates the coupled weights and the weights are dynamically reconfigurable to change the location of the center of mass relative to an axis of rotation.

12 Claims, 10 Drawing Sheets

(56) References Cited

U.S. PATENT DOCUMENTS

| | | | |
|---|---|---|---|
| 6,373,702 B2 | 4/2002 | Oishi et al. |
| 6,483,926 B1 | 11/2002 | Yamashita et al. |
| 6,524,692 B1 | 2/2003 | Rosen |
| 6,596,976 B2 | 7/2003 | Lin et al. |
| 6,603,620 B1 | 8/2003 | Berding |
| 6,627,818 B2 | 9/2003 | Kamel et al. |
| 6,633,481 B2 | 10/2003 | Pavol |
| 6,647,328 B2 | 11/2003 | Walker |
| 6,664,491 B2 | 12/2003 | Yanai et al. |
| 6,665,192 B2 | 12/2003 | Wimberger Friedl et al. |
| 6,693,622 B1 * | 2/2004 | Shahoian ............... G06F 3/016 345/156 |
| 6,744,186 B2 | 6/2004 | Oishi et al. |
| 6,809,916 B2 | 10/2004 | Nakata et al. |
| 6,859,357 B2 | 2/2005 | Morimoto et al. |
| 6,924,996 B2 | 8/2005 | Sugawara |
| 6,968,954 B2 | 11/2005 | Hsieh |
| 7,009,835 B2 | 3/2006 | Desai et al. |
| 7,059,182 B1 | 6/2006 | Ragner |
| 7,094,094 B2 | 8/2006 | Zahnen et al. |
| 7,113,351 B2 | 9/2006 | Hovanky |
| 7,133,281 B2 | 11/2006 | Bae |
| 7,161,580 B2 | 1/2007 | Bailey et al. |
| 7,167,360 B2 | 1/2007 | Inoue et al. |
| 7,259,357 B2 | 8/2007 | Walker |
| 7,260,885 B2 | 8/2007 | Albrecht et al. |
| 7,354,315 B2 | 4/2008 | Goetz et al. |
| 7,369,345 B1 | 5/2008 | Li et al. |
| 7,373,863 B2 | 5/2008 | O'Banion et al. |
| 7,375,645 B2 | 5/2008 | Tsai |
| 7,382,567 B2 | 6/2008 | Liao et al. |
| 7,393,575 B2 | 7/2008 | Boss |
| 7,450,332 B2 | 11/2008 | Pasolini et al. |
| 7,463,436 B2 | 12/2008 | Takahashi et al. |
| 7,477,469 B2 | 1/2009 | Cook et al. |
| 7,492,544 B2 | 2/2009 | Jeansonne et al. |
| 7,525,751 B2 | 4/2009 | Han et al. |
| 7,532,478 B2 | 5/2009 | Jeong |
| 7,549,335 B2 | 6/2009 | Inoue et al. |
| 7,554,798 B2 | 6/2009 | Tanokuchi et al. |
| 7,568,942 B1 | 8/2009 | Lannon et al. |
| 7,578,691 B2 | 8/2009 | Weksler et al. |
| 7,607,610 B1 | 10/2009 | Sterchak |
| 7,612,994 B2 | 11/2009 | Ulrich et al. |
| 7,619,891 B2 | 11/2009 | Woo et al. |
| 7,643,243 B2 | 1/2010 | Lee et al. |
| 7,652,892 B2 | 1/2010 | Shiu et al. |
| 7,660,107 B2 | 2/2010 | Leung |
| 7,684,183 B2 | 3/2010 | Mori et al. |
| 7,760,289 B2 | 7/2010 | Nakanishi et al. |
| 7,817,373 B2 | 10/2010 | Choi et al. |
| 7,839,051 B2 | 11/2010 | Klinghult |
| 7,855,892 B2 | 12/2010 | Lin |
| 7,919,945 B2 | 4/2011 | Houston et al. |
| 7,924,552 B2 | 4/2011 | Tseng |
| 8,044,818 B2 | 10/2011 | Tysowski et al. |
| 8,075,981 B2 | 12/2011 | Pearce et al. |
| 8,093,811 B2 | 1/2012 | Tanokuchi et al. |
| 8,106,789 B2 | 1/2012 | Yang et al. |
| 8,144,453 B2 | 3/2012 | Brown et al. |
| 8,189,280 B2 | 5/2012 | Ollila et al. |
| 8,190,015 B2 | 5/2012 | Li et al. |
| 8,248,777 B2 | 8/2012 | Prest |
| 8,275,420 B2 | 9/2012 | Lim |
| 8,289,689 B2 | 10/2012 | Chen et al. |
| 8,289,715 B2 | 10/2012 | Takahara |
| 8,305,744 B2 | 11/2012 | Shedletsky et al. |
| 8,330,305 B2 | 12/2012 | Hart et al. |
| 8,368,641 B2 | 2/2013 | Tremblay et al. |
| 8,411,432 B1 | 4/2013 | Zimlin et al. |
| 8,421,763 B2 | 4/2013 | Liao |
| 8,430,381 B2 | 4/2013 | Chen |
| 8,446,475 B2 | 5/2013 | Topliss et al. |
| 8,467,133 B2 | 6/2013 | Miller |
| 8,564,424 B2 | 10/2013 | Evarts et al. |
| 8,694,251 B2 | 4/2014 | Janardhanan et al. |
| 8,798,534 B2 | 8/2014 | Rodriguez et al. |
| 8,862,182 B2 | 10/2014 | Shukla et al. |
| 8,872,448 B2 | 10/2014 | Boldyrev et al. |
| 8,896,995 B2 | 11/2014 | Shedletsky et al. |
| 8,903,519 B2 | 12/2014 | King et al. |
| 9,134,337 B2 | 9/2015 | Simoni et al. |
| 9,167,061 B2 | 10/2015 | Shuster |
| 9,300,776 B2 | 3/2016 | Petersen |
| 2005/0017396 A1 | 1/2005 | Pearce et al. |
| 2005/0140503 A1 * | 6/2005 | Murray ................ H02K 7/061 340/407.1 |
| 2006/0109581 A1 | 5/2006 | Li et al. |
| 2007/0106483 A1 | 5/2007 | Kelley et al. |
| 2008/0024972 A1 | 1/2008 | Yamaguchi |
| 2008/0091309 A1 | 4/2008 | Walker |
| 2008/0163716 A1 | 7/2008 | Battlogg et al. |
| 2008/0192124 A1 | 8/2008 | Nagasaki |
| 2009/0212130 A1 | 8/2009 | Franklin, Jr. |
| 2009/0273480 A1 | 11/2009 | Mittleman et al. |
| 2010/0149073 A1 | 6/2010 | Chaum et al. |
| 2010/0161131 A1 | 6/2010 | Goswami et al. |
| 2010/0162835 A1 | 7/2010 | Lee et al. |
| 2010/0164152 A1 | 7/2010 | Li |
| 2010/0272969 A1 | 10/2010 | Taylor |
| 2011/0040410 A1 | 2/2011 | Kim et al. |
| 2011/0132114 A1 | 6/2011 | Siotis |
| 2011/0228460 A1 | 9/2011 | Kim et al. |
| 2011/0257765 A1 | 10/2011 | Evans et al. |
| 2011/0310500 A1 | 12/2011 | Osaka et al. |
| 2012/0212484 A1 | 8/2012 | Haddick et al. |
| 2012/0212499 A1 | 8/2012 | Haddick et al. |
| 2012/0234981 A1 | 9/2012 | Nagabhushan et al. |
| 2013/0038278 A1 | 2/2013 | Park et al. |
| 2013/0063885 A1 | 3/2013 | Shedletsky et al. |
| 2013/0073095 A1 | 3/2013 | King et al. |
| 2013/0077278 A1 | 3/2013 | Prest |
| 2013/0090881 A1 | 4/2013 | Janardhanan et al. |
| 2013/0100591 A1 | 4/2013 | Montevirgen et al. |
| 2013/0127980 A1 | 5/2013 | Haddick et al. |
| 2013/0218058 A1 | 8/2013 | Ceoldo et al. |
| 2013/0257582 A1 | 10/2013 | Rothkopf et al. |
| 2013/0278631 A1 | 10/2013 | Border et al. |
| 2013/0285490 A1 * | 10/2013 | Rothkopf ............... H02K 7/063 310/66 |
| 2014/0253284 A1 | 9/2014 | Peterson et al. |
| 2014/0260723 A1 | 9/2014 | Ely et al. |
| 2014/0273607 A1 | 9/2014 | Orand et al. |
| 2015/0301565 A1 | 10/2015 | Manullang et al. |
| 2016/0154439 A1 | 6/2016 | Rothkopf et al. |

FOREIGN PATENT DOCUMENTS

| | | |
|---|---|---|
| CN | 2794023 | 7/2006 |
| CN | 201230310 | 4/2009 |
| CN | 102857589 | 1/2013 |
| EP | 1057504 | 12/2000 |
| GB | 715773 | 9/1954 |
| GB | 1133198 | 11/1968 |
| JP | 2011099758 | 5/2011 |
| KR | 2004036970 | 5/2004 |
| TW | 501329 | 9/2002 |
| TW | I303192 | 11/2008 |
| WO | WO2010/135421 | 11/2010 |

* cited by examiner

DYNAMIC CENTER OF MASS

CROSS-REFERENCE TO RELATED APPLICATIONS

The present application is related to U.S. patent application Ser. No. 13/437,903, filed Apr. 2, 2012 and titled "Protecting an Electronic Device" and U.S. patent application Ser. No. 13/234,324, filed Sep. 16, 2011 and titled "Protective Mechanism for an Electronic Device," the disclosures of which are hereby incorporated herein by reference in their entireties.

TECHNICAL FIELD

The present application is related to rotating, coupled masses and, more particularly to changing a center of mass of a rotating mass to achieve a desired effect.

BACKGROUND

Haptic devices are generally designed to provide a tactile feedback to users of electronic devices. A commonly implemented haptic device is an eccentric weight that is rotated to cause vibration to occur. Generally, the stronger the vibrations, the more effective the haptic device. That is, a higher amplitude vibration will typically provide better feedback to a user than a low amplitude vibration. The amplitude may vary with several parameters; some of these are the frequency at which the weight rotates and the location of the center of mass relative to the axis of rotation, both of which are generally fixed parameters in conventional haptic devices.

SUMMARY

Systems and techniques for operating a dynamic rotating mass are discussed herein. The dynamic rotating mass may be used to generate vibration and/or alter angular momentum of a falling device. In particular, a system is provided having a motor, a shaft extending from the motor, and a weight attached to the shaft. Operation of the motor rotates the shaft and the weight is dynamically reconfigurable when rotating to change the location of the center of mass relative to an axis of rotation.

Another embodiment may take the form of a method of providing vibrations in an electronic device including operating a motor to rotate a shaft with a weight coupled to the shaft. The weight having an outer member and an inner member. The inner member is movable within a slot of the outer member. The method also includes changing a position of the inner weight within the slot to alter the center of mass of the weight.

Yet another embodiment may take the form of an electronic device having a processor, a communication system coupled to the processor, a controller coupled to the processor, a motor operatively coupled to the controller and a shaft coupled to the motor and configured to be rotated by the motor. A set of coupled weights is coupled to the shaft and include a first weight encompassing a second weight. A center of mass of the set of coupled weights may be offset from an axis of rotation of the shaft and the second weight is displaceable within the first weight to alter the position of the center of mass relative to the axis of rotation.

While multiple embodiments are disclosed, still other embodiments of the present invention will become apparent to those skilled in the art from the following Detailed Description. As will be realized, the embodiments are capable of modifications in various aspects, all without departing from the spirit and scope of the embodiments. Accordingly, the drawings and detailed description are to be regarded as illustrative in nature and not restrictive.

The drawings are provided to help readers better understand the concepts discussed herein. They are not however intended to be limiting in any way.

DETAILED DESCRIPTION

A system of coupled masses that can be driven at varying frequencies is provided. The masses may be coupled to a motor and have an axis of rotation such that some frequencies produce vibration while others produce a reduced vibration amplitude and still others may produce no vibration at all. In one embodiment, two coupled masses may be provided with one configured to be driven at various frequencies. The other mass may be passively attached or otherwise movably attached so that, in some embodiments, it may displace from a rest position due to centrifugal force as the first mass spins and a centripetal force (such as exerted by the first weight) may hold the second weight in the curved rotational path about the axis of rotation.

In one embodiment, the first weight is driven on an axis that does not go through the center of the mass for the coupled masses, thus generating vibration when driven at low frequencies or any frequency. In another embodiment, the first weight may be driven on an axis near or through the center of the mass. Hence, at low rotational speed, the weight produces little or no vibration. The second weight may be displaced, thereby shifting the center of mass from being at or near the center of the axis of rotation to generate vibration. In some embodiments, the shifting of the second weight is caused by centrifugal force. For example, the second weight may be located at or near an axis of rotation and is pulled away from the center as the weights spin. In other embodiments, the shifting of the second mass may be prompted by other forces. For example, a magnetic force may push or pull the second mass to a displaced position. Additionally, a restorative force may return the second weight to its original or resting position. This force may be provided by a spring, by the second weight itself or by a magnet.

The shifting of the center of mass of the coupled weights allows selective harmonic response of the vibration system to user input, alerts and so forth. That is, the weights may be configured to alter the center of mass at select frequencies to obtain a desired result. For example, the weights may reconfigure at a select frequency or over a range of frequencies that may alter an effect of the spinning weights. For example, the reconfigured weights may correspond to a high amplitude vibration output.

Figure 1:
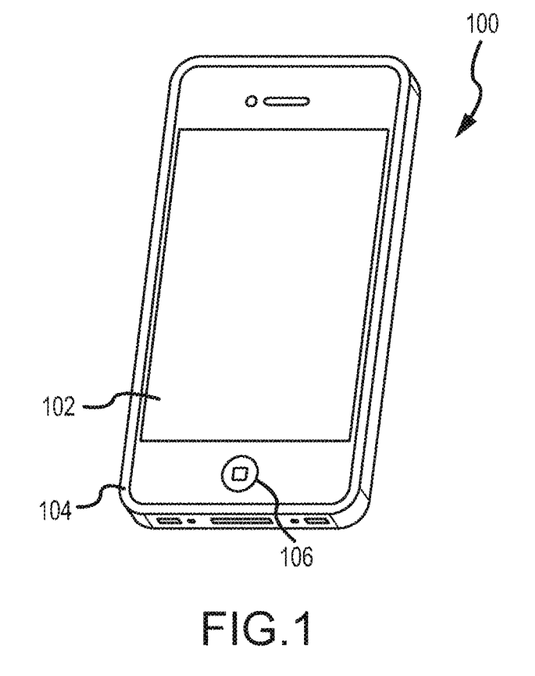
FIG. 1 is an isometric view of an example electronic device.

Turning to the drawings and referring to FIG. 1, an isometric view of an example mobile electronic device 100 is illustrated. The mobile electronic device 100 may include one or more haptic devices that may serve as alerts to a user and/or function to alter angular momentum of the device to help reduce damage or likelihood of damage to the device 100 (or select components of the device 100) upon impact from a free-fall. It should be appreciated that the mobile electronic device 100 may take any suitable form, including but not limited to a digital music player (e.g., MP3 player), a digital camera, a smart phone (e.g., iPhone® by Apple, Inc.), a laptop computer, or tablet computer.

The mobile electronic device 100 may include a display screen 102, an enclosure 104, and an input member 106. Generally, the display screen 102 provides a visual output for the mobile computing device 100 and may take the form of a liquid crystal display screen, plasma screen, organic light emitting diode display, and so on. Additionally, in some embodiments the display screen 102 may provide both input and an output functionality. For example, the display screen 102 may include a capacitive input sensor so to receive input form a user upon the user touching the display screen with his or her finger. The enclosure 104 defines a structure that may at least partially enclose the various components of the mobile computing device 100. The input member 106 permits a user to provide input to the mobile computing device 100. The input member 106 may include one or more buttons, switches, or the like that may be pressed, flipped, or otherwise activated in order to provide an input to the mobile computing device 106. For example, the input member 106 may be a button to alter the volume, return to a home screen, or the like. Additionally, the input member 106 may be any suitable size or shape, and may be located in any area of the mobile computing device 100. Furthermore, the input member 106 may be combined with the display screen 102 as a capacitive touch screen.

Figure 2:
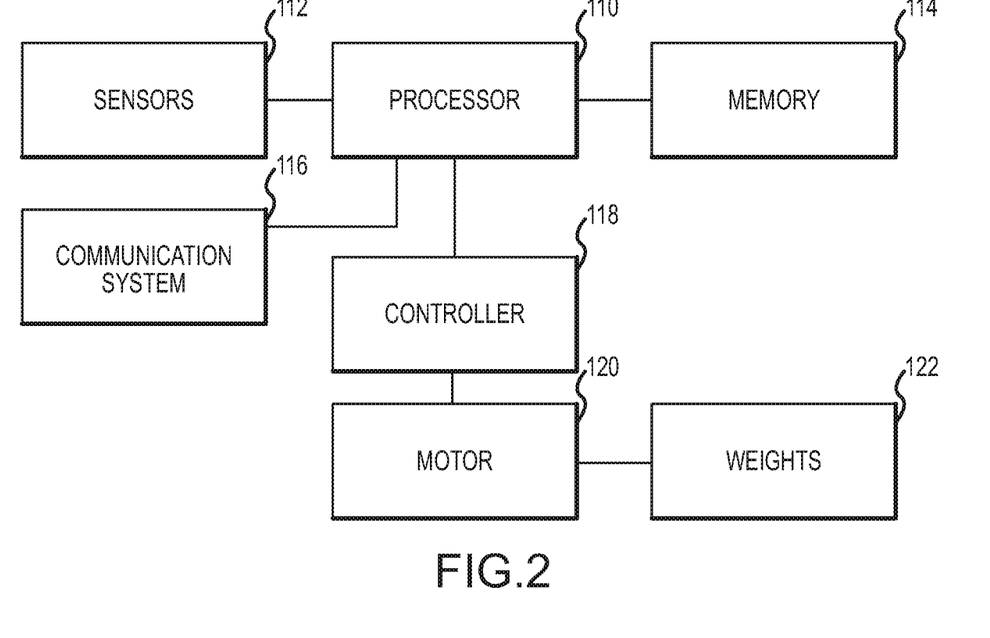
FIG. 2 is a block diagram of an example electronic device.

FIG. 2 is a block diagram of an embodiment of the mobile computing device 100 illustrating select electrical components. The mobile computing device 100 may include a processor 110, sensors 112, memory 114, and a network/communication system interface 116. The mobile computing device 100 may also include a controller 118, a motor 120 and weights 122. The controller 118 may be coupled to the processor 110 and configured to operate the motor 120. The motor 120 may drive the weights 122 in order to generate a vibration alert, tactile feedback to a user, and/or to alter the angular momentum of the device 100 in the event of a free-fall. As such, the mobile device 100 may be configured to operate the motor 120 to provide an appropriate response to user input (e.g., via the sensors), to incoming data (e.g., an incoming text, call, email, and so forth via the network communication system interface 112), to a free-fall event (e.g., as sensed by one or more of an accelerometer, gyroscope, and so forth), or other events. The configuration of the device 100 may be performed at least in part by programming the device upon manufacture. Additionally, certain configurations may be performed by an end user. For example, and end user may be able to selectively configure alerts indicated by operation of the motor 120. It should be appreciated that the device 100 may include more or fewer components and FIG. 2 is intended to be exemplary only.

Figure 3A:
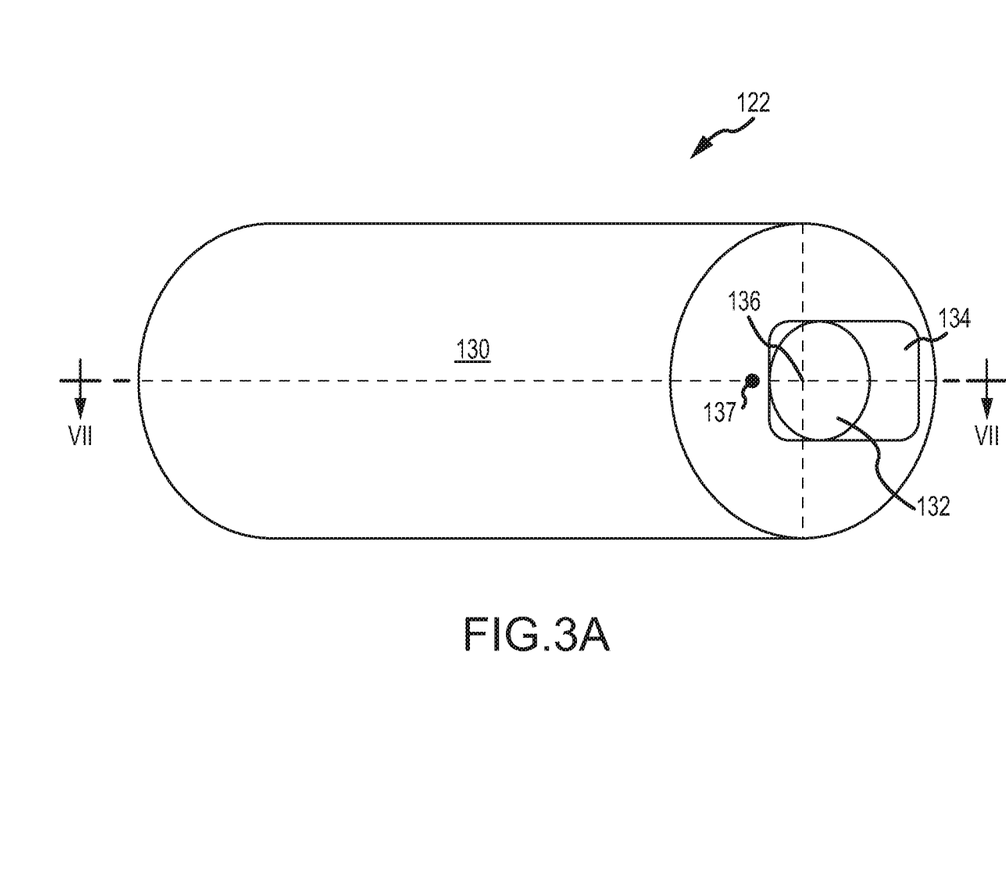
FIG. 3 illustrates an example of coupled weights.

FIG. 3A illustrates an example of the weights 122. The weights may 122 take the form of a coupled mass. Specifically, the weights 122 may include two or more distinct weight members that are coupled together or placed together so as to form a mass having a center of mass. As illustrated, for example, the weights 122 may include a first weight 130 and a second weight 132. The first weight 130 may generally be larger than the second weight 132 and may have more mass than the second weight. Additionally, the first weight 130 may house the second weight 132. That is, the second weight 132 may be located within the first weight 130. In FIG. 3A, for example, the second mass 132 may reside within a slot 134 of the first mass 130. It should be appreciated that the weights 122 may be coupled together in a variety of different manners to achieve the desired purposes. That is, the second weight 132 and the first weight 130 may be coupled together in any suitable manner that allows for one or both of the weights to displace from a rest position relative to the other weight to change a center of mass for the weights 122.

The second weight 132 may be secured within the slot 134 of the first weight 130 in any suitable manner. For example, the second weight 132 may be coupled at its base within the slot 134 to allow displacement of the second weight through deflection or displacement of the second weight. In other embodiments, the slot 134 may be provided with retaining features (not shown) such as one or more tabs located about the edge of the slot and extending into the slot, to prevent the second weight from exiting the slot. In still other embodiments, the second weight may be formed from the first weight by removing material of the first weight to form the slot 134 and leaving the second weight In some embodiments, the first and second weights 130, 132 may be made of the same material. For example, in some embodiments, tungsten may be used for each weight. Further, one or more of the weights may be magnetic. In other embodiments, the first and second weights 130, 132 may be made from different materials. For example, the first weight 130 may be made from tungsten and the second weight 132 may be made from a magnetic material. Generally, the materials selected for use as the weights 122 will be dense materials so that they have a high weight to volume ratio. This allows for smaller sized weights while still providing a desired output vibration or effect upon angular momentum. Additionally, the weights 122 may take any suitable shape. As shown, the first and second weights 130, 132 are cylinders. However, other shapes may be implemented. Moreover, the first weight 130 and the second weight may take different shapes.

A geometric center 136 of an end of the first weight 130 is illustrated at the intersection of the dashed cross-hairs. Additionally, a center of mass 137 is shown as being slightly offset to the left of the geometric center 136. Due to the slot in the first weight 130 and the positioning of the second weight 132, the geometric center may not correspond with a center of mass of the weights 122. In some embodiments, the geometric center 136 may correspond to an axis of rotation. In other embodiments, the axis of rotation may correspond to a center of combined mass of the weights 122. Further, in some embodiments, one or more of the center of mass, axis of rotation, and geometric center may coincide.

Figure 3B:
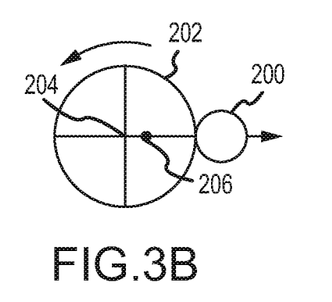

FIGS. 3B-3F illustrate several different alternative example embodiments of coupled weights. In each, first and second weights may displace relative to each other as the weights are spun. In each of FIGS. 3B-C, an axis of rotation is perpendicular to the drawing (e.g., extends out from the sheet), whereas in FIG. 3D the axis of rotation is shown as being parallel to the drawing (e.g., runs left to right). In FIG. 3B, second weight 200 is external to the first weight 202. A geometric center 204 of the first weight 202 is shown as well as a center of mass 206 for the coupled weights. As the weights spin, the second weight 200 separates from the first weight 202 as shown by the arrows.

Figure 3C:
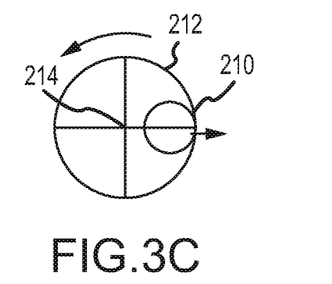
Figure 3D:
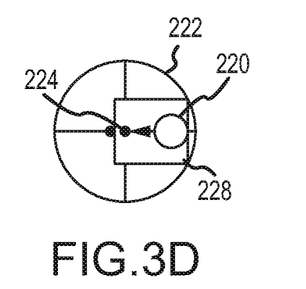
Figure 3E:
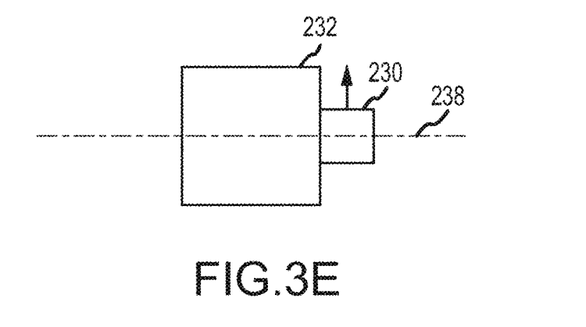
Figure 3F:
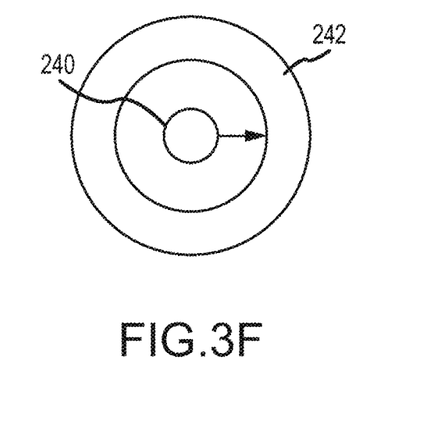

In FIG. 3C, the second weight 210 may be located within the first weight 212 while at rest and may exit or separate from the first weight when spun. In this embodiment, the center of mass and axis of rotation may each be near the geometric center 214 of the first weight 212. In FIG. 3D, the second weight 220 may be disposed within a slot 228 of the first weight 222 but may displace towards a geometric center 224 of the first weight 222 when the weights are spun. In this example, the axis of rotation may be at or near a center of the second weight when at rest. In some embodiments, the second weight's position may be actively controlled using magnets, for example. In FIG. 3E, the second weight 230 may again be external to the first weight 232 and axis of rotation 238 may pass through one or both of the weights. As the weights are spun, the second weight 230 may displace along a surface of the first weight 230 to change the center of mass relative to the axis of rotation 238. In still other embodiments, the first weight 242 may take an annular shape into which the second weight 240 is disposed, as shown in FIG. 3F.

Figure 4:
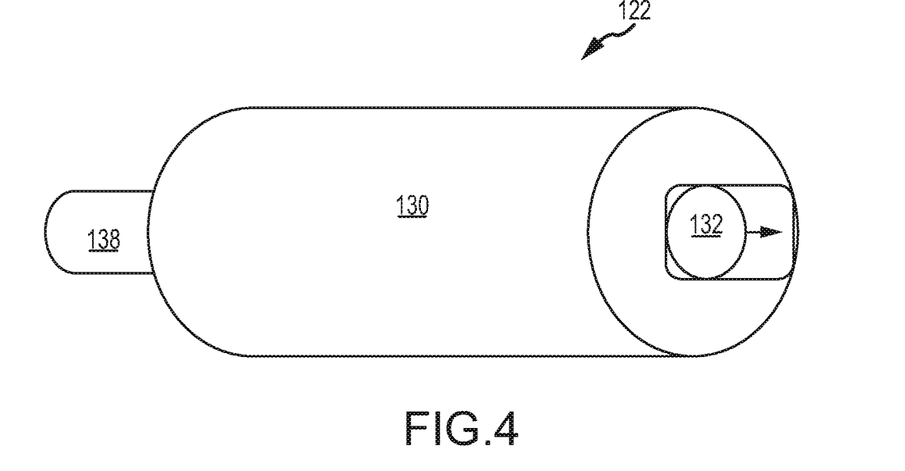
FIG. 4 illustrates the coupled weights of FIG. 3 coupled to a shaft with a second weight in a resting position.
Figure 5:
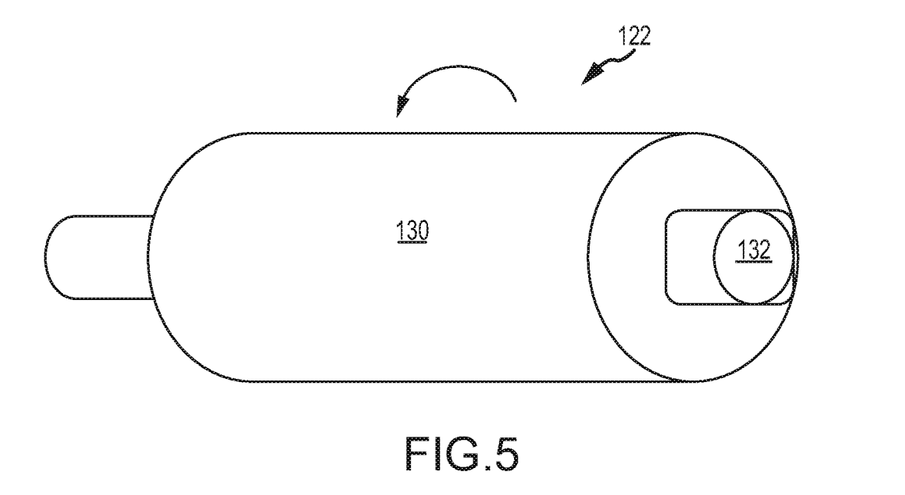
FIG. 5 illustrates the coupled weights of FIG. 3 rotating and the second weight being displaced from the resting position to alter a center of mass of the coupled weights.

FIG. 4 illustrates the weights 122 with the first weight 130 attached to a shaft 138. In particular, the shaft 138 may be coupled the geographic center of the first weight 130. The shaft 138 may also be coupled to the motor 120 and the motor may drive the shaft so that rotates about its longitudinal axis. As mentioned previously, the second weight 132 may be passively coupled to the first weight so that it may move relative to the first weight. In some embodiments, the second weight 132 is at rest at or near an inner position within the slot 134. That is, a center of the second weight 132 may rest at or near the geometric center of the first weight. As shown in FIG. 5, as the shaft 138 and the first weight 130 rotate, centrifugal force may push the second weight 132 to an outer position within the slot 134.

The displacement of the second weight 132 causes a shift in the center of the mass of the coupled weights. As such, the center of mass is moved further away from the axis of rotation, thereby providing an output with an increased amplitude. Specifically, as the center of mass shifts due to the shifting of the second weight away from the axis of rotation, the angular velocity of the second weight and therefore the angular momentum of the second weight increases to increase the amplitude of vibration. The increased amplitude may better alert and obtain the attention of the user. Additionally, in embodiments, where the weights are utilized to alter the angular momentum of the falling device, the altered center of mass and increased amplitude output may help to better alter the angular momentum.

Figure 6:
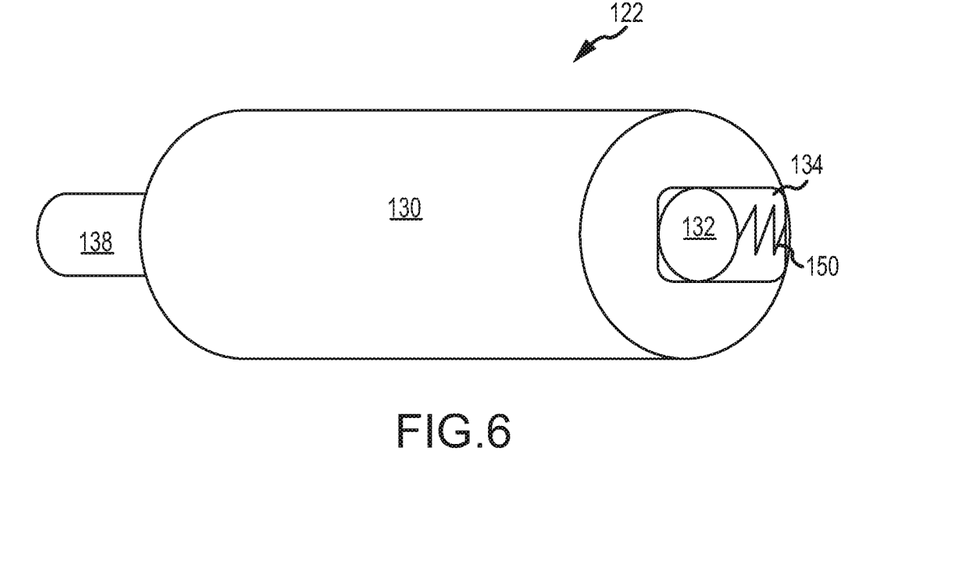
FIG. 6 illustrates the coupled weights of FIG. 3 having a spring provide a restoring force to restore the second weight back to the resting position.

FIG. 6 illustrates an embodiment that includes a spring 150 located within the slot 134 to hold the second weight 132 in the resting position. In particular, the spring 150 may be attached within the slot at or near an outer wall 152 of the slot. Although a single spring 150 is illustrated, multiple springs may be utilized some embodiments. Additionally, it should be appreciated that in other embodiments one or more springs may be located within the slot 134 at or near the inner wall in addition to or instead of the spring 150. Generally, the springs may be configured to hold the second weight 132 in place until the centrifugal force exceeds, and thereby overcomes, the restraining force of the spring and the second weight is displaced. More particularly, the spring 150 may be configured to exert a force on the second weight to hold it in its resting position until the centrifugal force exceeds the restoring force of the spring and the second weight displaces. It should be appreciated that as the spring is compressed, the force required to compress the spring increases, as such, the second weight may displace over a range of frequencies until the spring reaches a maximum compressed state that may correspond to a rotational frequency that produces a desired vibration. For example, the spring may be configured to hold the second weight in its rest position until a frequency is reached at which the weights 122 produce the desired vibrational amplitude in the device 100.

Figure 7:
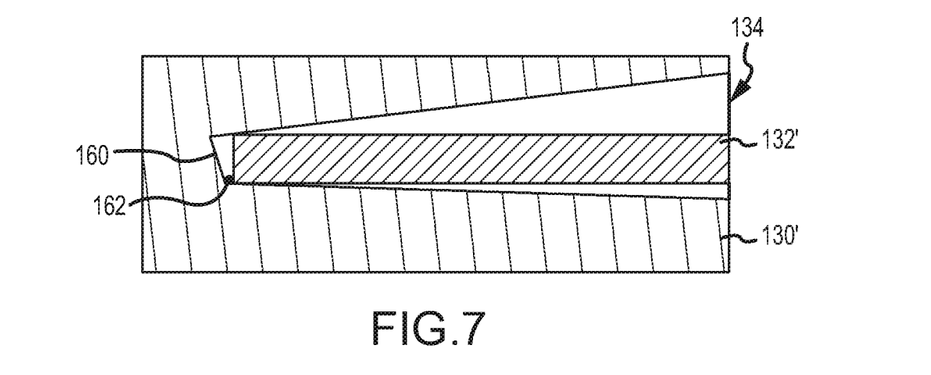
FIG. 7 is a cross-sectional view taken along line VII-VII of the coupled weights of FIG. 3 illustrating the second weight being attached at its base to the first weight in accordance with an alternative embodiment.

FIG. 7 is a cross-sectional view taken along line VII-VII in FIG. 3 showing another embodiment. In particular, in FIG. 7, the second weight 132' is shown as a deflecting beam. The second weight 132' may be attached at its base 160 to an interior surface 162 of the slot 134 of the first weight 130. The second weight may be hinged, or otherwise movably attached the interior surface 162. For example, a spring hinge may be implemented to provide a restoring force. In some embodiments, ball and socket joint may movably attach the first and second weights. Alternatively, the second weight may be slideably attached to the interior surface 162. In other embodiments, the second weight may be formed from the same block of material as the first weight. For example, the second weight may be formed as material is removed from the first weight to create the slot 134. In embodiments where the first and second weights 130', 132' are made of the same material, this may be a more efficient way to manufacture the weights 122. However, where the first and second weights are made of different materials, the second weight is attached within the slot 134.

As the weights are spun by the motor 120, the second weight 132' deflects within the slot 134 to move from its resting position to the outer position. Therefore, the slot 134 may be tapered in some embodiments and still accommodate displacement of the second weight. In other embodiments, the slot may have squared edges rather than tapered edges. As with the previous embodiment, the second weight 132' may displace when the centrifugal force exceeds a restoring force that may correlates to a frequency that generates a desired result. In some embodiments, the second weight 132' may act as a spring as it deflects and, as such, may be configured to deflect after a certain frequency of rotation is reached which generates centrifugal force that overcomes the force of the second weight 132'.

Figure 8A:
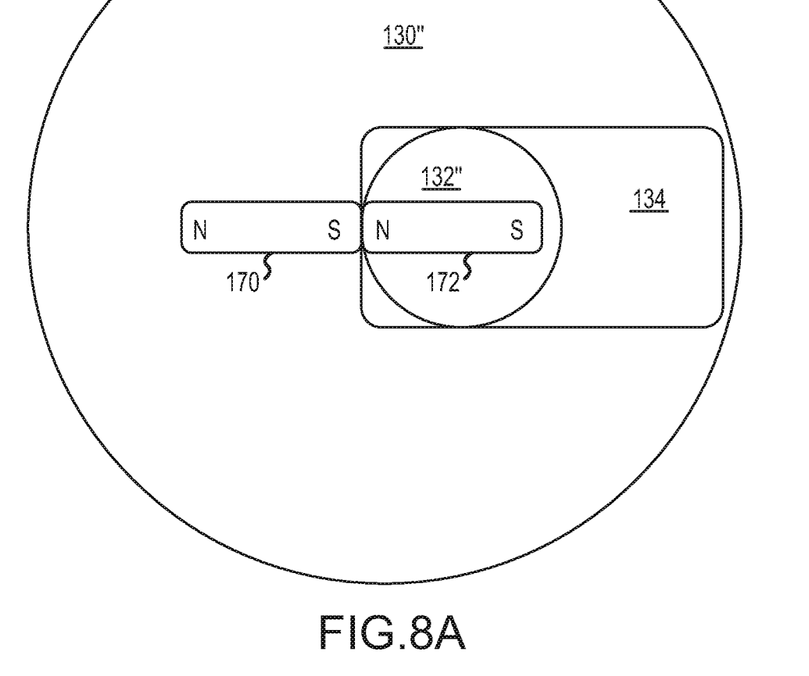
FIG. 8 illustrates the coupled weights of FIG. 3 including magnets to hold the second weight in a resting position.

Referring to FIG. 8, another embodiment is illustrated in which magnetic force is used to hold the second weight 132 in place or displace it. In FIG. 8, for example, the first weight 130" may include a magnet 170 having north and south poles. The second weight 132" may include a magnet 172 as well having north and south poles, but with the poles oriented oppositely from that of the magnet 170 of the first weight. As such, the south pole of magnet 170 may be oriented toward the north pole 172 so that the second weight is held in a resting position. Again, as the weights 122 spin centrifugal force will pull the second weight to a displaced position. However, the centrifugal force generally must exceed the magnetic force holding the second weight in the rest position before the second weight will move.

The magnets 170, 172 may be embedded in the first and second weights 130", 132" or may be adhered or otherwise attached to a surface of the respective weights. Several alternative embodiments may be implemented as well. For example, in one embodiment, one or both of the first and second weights 130", 132" may be magnets. Alternatively, one of the weights may be a magnet and the other a magnetic material. In yet another embodiment, one or more weights may be an electromagnet that may be selectively magnetized to hold the second weight in a desired position. The controller may be used in some embodiments to control the magnetism of the weights. In some embodiments, the poles of the electromagnet may be reversed to repel the second weight to a displaced position. Additionally, the first weight may include magnets near the displaced position of the second weight to either hold or repel the second weight.

Figure 8B:
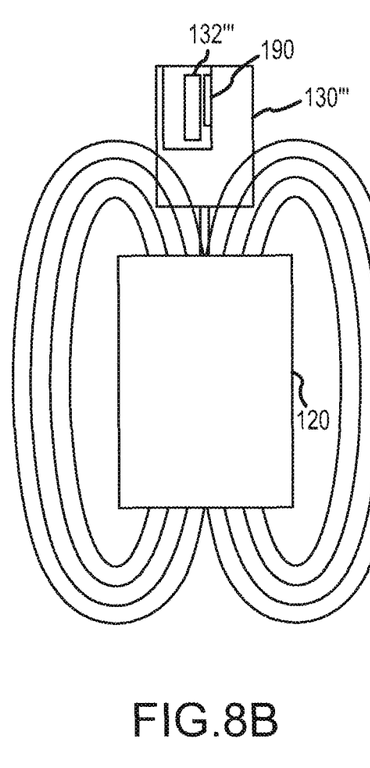

Further, in some embodiments, the motor 120 may be used to provide the magnetism for the weights 122. FIG. 8B illustrates the motor 120 generating magnetic flux lines which may influence the positioning of the second weight 132''' located within the first weight 130'''. Magnetic flux lines 189 are illustrated to show how a magnetic field from operation of the motor 120 may reach the first and second weights. Further, a magnetic member 190 may be provided within the first member and which may be influenced by the magnetic field of the motor to either displace or hold the second weight 132''' in a desired location. The weight spins in synchronization with the motor, and the motor's magnetic coils are driven in a pattern similar to a sinusoid. Therefore in the weight's rotating reference frame, the magnetic field from the motor is always in approximately the same direction, assuming the weight is attached directly without a gearbox. When the motor is off or driven at low power, the movable weight 132 will not shift, while the magnetic field will shift the weight when the motor is driven at a higher power.

Figure 9:
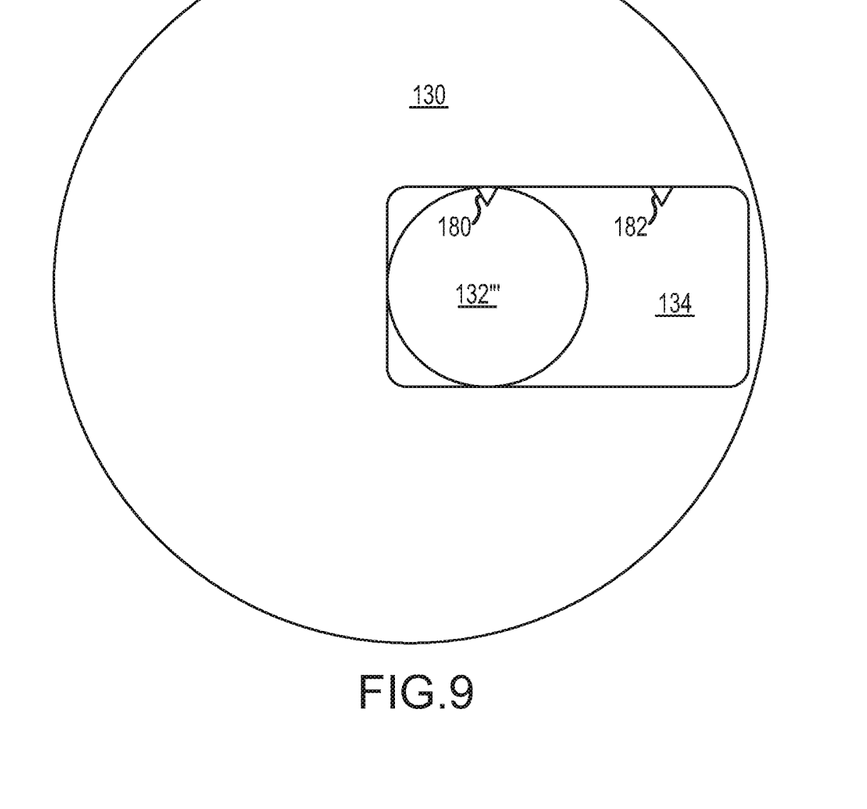
FIG. 9 illustrates the coupled weights of FIG. 3 including detents to hold the second weight in a displaced position.

FIG. 9 illustrates yet another alternative embodiment in which detents are used to hold the second weight in a desired position. In particular, the slot 134 may include one or more detents 182 that correspond to apertures 180 in the second weight 132'''. In one embodiment, a detent may help secure the second weight in a rest position. In another embodiment, a detent may help secure the second weight in a displaced position. The detents may be made of any suitable material and in one embodiment may be made of the same material as one of the first or second weights. Additionally, the detents may take any suitable shape, such as triangular, square and so forth.

The use of a detent in the resting position helps to hold the second weight in the rest position when the weights are spun at a relatively low frequency and up until some threshold frequency is reached. Upon reaching the threshold frequency, centrifugal force may displace the second weight. Similarly, the detent in the displaced position may be used to hold the second weight in the displaced position at lower frequencies. In particular, the motor may initially operate at a high frequency to displace the second weight, the motor may then reduce its frequency and the second weight may maintain its displaced position. This may be useful to help conserve power, as the motor may operate at lower speeds and still achieve a high amplitude output due to the displaced second weight. A spring or other device (not shown) may provide a restorative force to help return the second weight to its resting position once the motor stops.

The foregoing describes some example embodiments of coupled masses used to generate vibration and/or alter angular momentum of a falling device. Although the foregoing discussion has presented specific embodiments, persons skilled in the art will recognize that changes may be made in form and detail without departing from the spirit and scope of the embodiments. Additionally, one or more of the embodiments may be combined together to achieve a desired performance. For example, a spring maybe implemented with an embodiment utilizing magnets to help hold and return the second weight to a resting position. Accordingly, the specific embodiments described herein should be understood as examples and not limiting the scope thereof.

The invention claimed is:

1. A system comprising:
a motor; and
a weight structure coupled to the motor, the weight structure comprising:
a first weight; and
a second weight at least partially contained within an aperture defined by the first weight,
wherein the second weight is configured to move within the aperture of the first weight to shift a center of mass of the weight structure, wherein a first magnet is embedded in the first weight, and wherein a second magnet is embedded in the second weight.

2. The system of claim 1, further comprising a spring element configured to apply a restoring force on the second weight.

3. The system defined in claim 1, wherein the first magnet has poles, and wherein the second magnet has poles that are oriented oppositely from the poles of the first magnet.

4. The system defined in claim 1, wherein the first magnet has a north pole and a south pole, wherein the second magnet has a north pole and a south pole, and wherein the south pole of the first magnet is oriented towards the north pole of the second magnet.

5. The system defined in claim 1, wherein the first weight has a first shape and the second weight has a second shape that is different than the first shape.

6. The system defined in claim 1, wherein the first weight is larger than the second weight.

7. A system comprising:
a motor; and
a weight structure coupled to the motor, the weight structure comprising:
a first weight; and
a second weight at least partially contained within an aperture defined by the first weight, wherein the second weight is configured to move within the aperture of the first weight to shift a center of mass of the weight structure, wherein the second weight includes a magnet, and wherein the second weight is magnetized by the motor.

8. The system defined in claim 7, wherein the first weight has a first shape and the second weight has a second shape that is different than the first shape.

9. The system defined in claim 7, wherein the first weight is larger than the second weight.

10. A system comprising:
a motor; and
a weight structure coupled to the motor, the weight structure comprising:
a first weight; and
a second weight at least partially contained within an aperture defined by the first weight, wherein the second weight is configured to move within the aperture of the first weight to shift a center of mass of the weight structure, wherein the first weight has at least one detent, and wherein the second weight has at least one detent that corresponds to the at least one detent of the first weight.

11. The system defined in claim 10, wherein the first weight has a first shape and the second weight has a second shape that is different than the first shape.

12. The system defined in claim 10, wherein the first weight is larger than the second weight.

\* \* \* \* \*